(12) United States Patent
Rapanen (10) Patent No.: US 10,318,951 B2
(45) Date of Patent: Jun. 11, 2019

(54) TRANSACTION MANAGEMENT (71) Applicant: TeliaSonera AB, Stockholm (FI)

(72) Inventor: Joni Rapanen, Espoo (FI)

(73) Assignee: TELIA COMPANY AB, Stockholm (SE)

( * ) Notice: Subject to any disclaimer, the term of this patent is extended or adjusted under 35 U.S.C. 154(b) by 901 days.

(21) Appl. No.: 14/741,082

(22) Filed: Jun. 16, 2015

(65) Prior Publication Data

US 2015/0363766 A1 Dec. 17, 2015

(30) Foreign Application Priority Data

Jun. 17, 2014 (FI) ...................................... 20145567

(51) Int. Cl.
*G06Q 20/32* (2012.01)
*G06Q 20/38* (2012.01)
*G06Q 20/12* (2012.01)
*G06Q 20/20* (2012.01)
*G06Q 20/34* (2012.01)

(52) U.S. Cl.
CPC ....... *G06Q 20/3278* (2013.01); *G06Q 20/127* (2013.01); *G06Q 20/20* (2013.01); *G06Q 20/3221* (2013.01); *G06Q 20/3223* (2013.01); *G06Q 20/3229* (2013.01); *G06Q 20/34* (2013.01); *G06Q 20/382* (2013.01)

(58) Field of Classification Search
CPC .................................................... G06Q 20/32
USPC ......................................................... 705/75
See application file for complete search history.

(56) References Cited

U.S. PATENT DOCUMENTS 8,407,112 B2 * 3/2013 Walter .................. G06Q 20/40
705/30
2013/0065678 A1 3/2013 Nelson et al.
2014/0052532 A1 2/2014 Tsai et al.
(Continued)

FOREIGN PATENT DOCUMENTS

EP 2 048 594 4/2009
WO 2013/013168 A2 1/2013

OTHER PUBLICATIONS

European search report, dated Nov. 16, 2015; Application No. 15 17 2011.
(Continued)

*Primary Examiner* — Robert R Niquette
*Assistant Examiner* — Liz P Nguyen
(74) *Attorney, Agent, or Firm* — Young & Thompson (57) ABSTRACT

A method for performing a transaction initiated with near field communication, NFC, interaction between a user terminal including a subscriber identity module residing in the user terminal and a NFC reader. In the method a request including an amount of the transaction and an identifier obtained from a secure element of the subscriber identity module residing in the user terminal is delivered and a payment card number corresponding to the identifier is obtained. Finally, a transaction request is initiated towards a transaction management system and in response to a successful acknowledgment from the transaction management system an acknowledgement on successful transaction is delivered, and in response to an unsuccessful acknowledgement from the transaction management system the transaction request, canceling the transaction.

15 Claims, 3 Drawing Sheets

(56) References Cited

U.S. PATENT DOCUMENTS

2014/0089113 A1    3/2014  Desai et al.
2014/0108263 A1    4/2014  Ortiz et al.
2014/0129435 A1    5/2014  Pardo et al.
2014/0315485 A1*  10/2014  Marie ................ H04L 63/0428
                                                         455/41.1

OTHER PUBLICATIONS

FI Search Report, dated Nov. 25, 2014, from corresponding FI application.

* cited by examiner

TRANSACTION MANAGEMENT

TECHNICAL FIELD

The invention concerns in general the technical field of NFC communication. Especially the invention concerns a solution relating to NFC transactions.

BACKGROUND OF THE INVENTION

NFC is an acronym for Near Field Communication. NFC enables a communication between two objects, for instance between a mobile terminal and a base station that has been equipped with an integrated or an ad hoc antenna. NFC's specificity is that the communication is established over a distance of a few centimeters, or even with the two objects touching. This is the main difference with other wireless technologies, such as Bluetooth and Wi-Fi that allow communication over a much larger distance.

Generally speaking NFC system comprises a terminal device or a tag, a base station, which many times is so called NFC reader for reading (and also writing in some cases) information from the terminal capable to NFC communication and/or NFC tag, and lot of back-end systems in order to provide information to be delivered, but also managing and controlling the data to be transferred as well as establishing secure paths for utilizing the NFC technique. It should also be mentioned that NFC communication is not limited to a pair of two devices, but merely the devices can talk with multiple other devices over the NFC technology.

The application areas of NFC technology are diversified. NFC technology as such serves in a very good way such areas in which contactless operation increases the speed of service, for example. Such areas of application are contactless tokens, ticketing and payments as well as pairing different devices for one reason or another.

In order to provide contactless NFC services to customers the network hierarchy is implemented so that there is so called Trusted Service Manager (TSM) to operate as an intermediary between NFC service providers and mobile telecom operators providing the networks for the end-customers. The TSM does not participate in actual transactions by NFC, but help service provider securely distribute and manage contactless services for the customers. In practice, the role of TSM is, among other things, to interconnect telecom operators and service providers, guarantee end-to-end security, maintain user related information, manage NFC services (e.g. activation/deactivation) and manage payment related issues. In this manner each party within the NFC system can concentrate to essential issues from their perspective. For example, the service providers have one-stop shop for establishing the NFC service when they have the service itself in place by using TSMs' services.

The drawback of the TSM implementation, especially in the payment area, is that as the TSM combines multiple different operators within the NFC area, there is lot of compatibility work to be done both at the operator and the TSM ends. Moreover, the same compatibility work shall be done between the service providers and the TSM. Thus, there is need to mitigate the compatibility work between different operators. The present invention relates especially to a mitigation of the compatibility issues within NFC solutions, especially within payment area.

SUMMARY OF THE INVENTION

An objective of the invention is to present a method, a server and a system for performing a transaction. Another objective of the invention is that the method, the server and the system for performing the transaction provide an improved solution enabling a reduced compatibility work within NFC area.

The objects of the invention are reached by a method, a server and a system as defined by the respective independent claims.

According to a first aspect, a method for performing a transaction is provided wherein the transaction is initiated with near field communication, NFC, interaction between a user terminal comprising a subscriber identity module residing in the user terminal and a NFC reader, the method comprises receiving, in a server, a request for the transaction, the request comprising an amount of the transaction and an identifier obtained from a secure element of the subscriber identity module residing in the user terminal through the interaction between the user terminal and the NFC reader; obtaining a payment card number corresponding to the identifier within the request by initiating a query to data storage accessible to the server, the data storage storing information on at least one identifier and at least one payment card number corresponding to the identifier; initiating a transaction request towards a transaction management system managing transactions with the payment card in question, the transaction request comprising the amount of the transaction and the payment card number; and in response to a successful acknowledgment from the transaction management system to the transaction request, delivering an acknowledgement on successful transaction, and in response to an unsuccessful acknowledgement from the transaction management system to the transaction request, canceling the transaction.

The method may further comprise decrypting the identifier obtained from a secure element of the subscriber identity module residing in the user terminal through the interaction between the user terminal and the NFC reader prior to obtaining the payment card number from a data storage.

The method may further comprise receiving a subscriber identity module related information in the request together with amount of the transaction and an identifier; generating a query towards a register residing in a mobile communication network by utilizing the subscriber identity module related information in order to establish a second level security.

Furthermore, the method may further comprise initiating a timer, in the server, in response to the transaction request towards the transaction management system; monitoring if the timer reaches a predetermined maximum value before receiving an acknowledgment from the transaction management system; and if the timer reaches the predetermined maximum value canceling the transaction.

According to a second aspect, a server for performing at least partly a transaction is provided wherein the transaction is initiated with near field communication, NFC, interaction between a user terminal comprising a subscriber identity module residing in the user terminal and a NFC reader, the server comprising a processing unit, a memory unit storing portions of computer program code and the server by executing at least part of the portions of the computer program code with the processing unit is caused to: receive a request for the transaction, the request comprising an amount of the transaction and an identifier obtained from a secure element of the subscriber identity module residing in the user terminal in through the interaction between the user terminal and the NFC reader; obtain a payment card number corresponding to the identifier within the request by initiating a query to data storage accessible to the server, the data storage storing information on at least one identifier and at least one payment card number corresponding to the identifier; initiate a transaction request towards a transaction management system managing transactions with the payment card in question, the transaction request comprising the amount of the transaction and the payment card number; and in response to a successful acknowledgment from the transaction management system to the transaction request, deliver an acknowledgement on successful transaction, and in response to an unsuccessful acknowledgement from the transaction management system to the transaction request, cancel the transaction.

The server may further be configured to decrypt the identifier obtained from a secure element of the subscriber identity module residing in the user terminal through the interaction between the user terminal and the NFC reader prior to obtaining the payment card number from data storage.

The server may further be configured to receive subscriber identity module related information in the request together with amount of the transaction and an identifier; generate a query towards a register residing in a mobile communication network by utilizing the subscriber identity module related information in order to establish a second level security.

The server may further be configured to initiate a timer in response to the transaction request towards the transaction management system; monitor if the timer reaches a predetermined maximum value before receiving an acknowledgment from the transaction management system; and if the timer reaches the predetermined maximum value canceling the transaction.

According to a third aspect, a system for performing at least partly a transaction is provided wherein the transaction is initiated with near field communication, NFC, interaction. The system comprises a NFC reader configured to interact with a secure element of a subscriber identity module residing in a user terminal in order to obtain an identifier stored in the secure element; a transaction management system for confirming the transaction; and a server communicatively coupled to the NFC reader and to the transaction management system wherein the server is configured to receive a request for the transaction from the NFC reader, the request comprising an amount of the transaction and the identifier obtained from a secure element of the subscriber identity module residing in the user terminal in through the interaction between the user terminal and the NFC reader; obtain a payment card number corresponding to the identifier within the request by initiating a query to data storage accessible to the server, the data storage storing information on at least one identifier and at least one payment card number corresponding to the identifier; initiate a transaction request towards a transaction management system managing transactions with the payment card in question, the transaction request comprising the amount of the transaction and the payment card number; and in response to a successful acknowledgment from the transaction management system to the transaction request, deliver an acknowledgement on successful transaction, and in response to an unsuccessful acknowledgement from the transaction management system to the transaction request, cancel the transaction.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 1 schematically illustrates an example of an environment in which the invention may be applied to.

DETAILED DESCRIPTION

Figure 1:
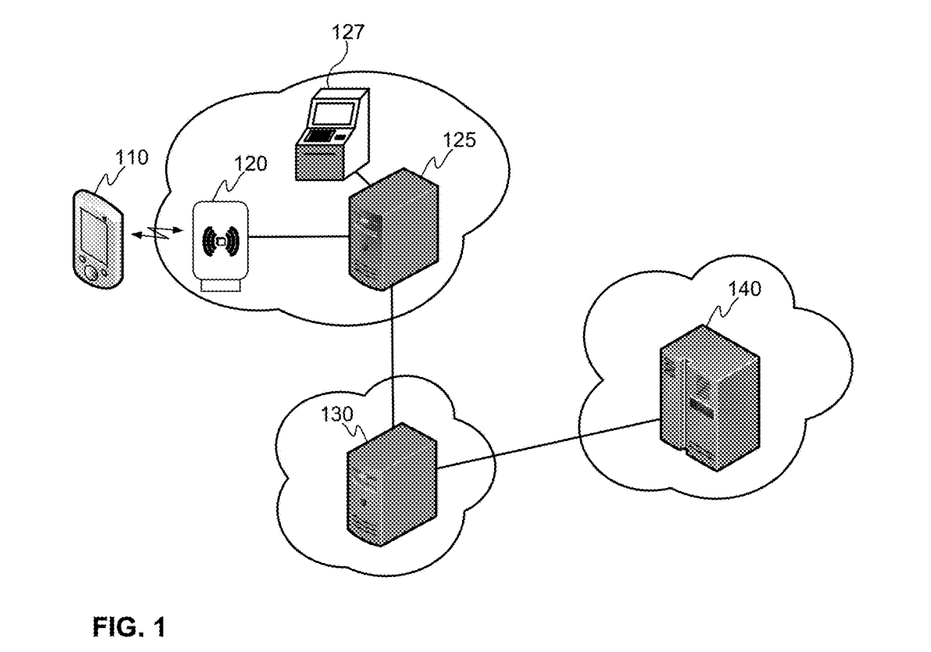

FIG. 1 illustrates an example of an environment in which the present invention may be implemented and applied to. Firstly, a near field communication (NFC) interface is arranged in the environment, wherein a user terminal 110 is arranged to communicate with a NFC reader 120 in order to perform a money transaction from the user of the user terminal 110 to another party offering the capability to perform the transaction through the NFC reader. Such a party may be, but is not limited to, an entity providing a product or service to the user of the user terminal 110. The user terminal 110 comprises a subscriber identity module (SIM), which provides, among other things, subscription related information, such as authentication keys and ciphering information, in order to communicate in a mobile communication network. Additionally, the subscriber identity module comprises so called secure element for storing predetermined data, which is managed by a party granting the subscriber identity module to the user. The secure element, or at least some part of it, may also be accessible by a further party to whom the party providing the subscriber identity module grants the access. For example, at least part of information stored in the subscriber identity module may be accessible through a NFC interaction, as will be described in the context of present invention. Typically the party granting the subscriber identity module is a telecom operator. The party granting the SIM may also be any other, but for clarity reasons the telecom operator is used as the party when describing the present inventive idea. The subscriber identity module may be an integrated circuit inserted in the user terminal and the user terminal and the SIM may interact together as will be described herein. Alternatively or in addition, the physical SIM card may be implemented as an embedded solution by storing computer program code in a memory of the user terminal, which provides, when executed by one or more processors, the corresponding functionalities as the physical SIM card. Moreover, the user terminal comprises necessary hardware and software elements in order to provide the operation of the device as well as the communication through the NFC interface. As such the technology of the user terminal is generally known from prior art solutions as regards to the communication itself and will not be described here. Generally speaking the user terminal 110 may be any device into which the functionalities of a SIM may be arranged. Such a device may be, but is not limited to, a mobile terminal, a tablet computer, a laptop computer or similar.

Furthermore, the NFC reader 120 is coupled to a backbone system 125 and thus arranged to communicate with a server 130 through the backbone system 125. The backbone system may be, but is not limited to, a payment system comprising a server and necessary data storage as well as cash register devices 127. The backbone system, i.e. the payment system, is configured to be used when a transaction between the buyer and seller is done, wherein the initiation of payment is performed through the NFC technology with the user terminal 110. The backbone system may exchange of information with the server 130. The backbone system may either deliver pieces of information relating to a transaction in separate messages to the server 130 or combine multiple pieces of information and deliver those in one message to the server 130.

Furthermore, the server 130 is communicatively coupled to a transaction management system 140. The transaction management system may comprise one or more servers and one or more databases for storing user related information e.g. in a format of a user data record comprising user related identification information, payment card number and any additional information for enabling a transaction for the user within a possible predetermined limits set for the user. Additionally, the transaction management system 140 may comprise information by means of which it is possible to invoice the user on transactions performed by him or her. Naturally, the devices and other entities belonging to the transaction management system 140 are arranged to communicate with each other for providing the transaction related service to a user through the server 130. The transaction management system 140 may belong, but is not limited to, to a bank or to a credit card company.

Figure 2:
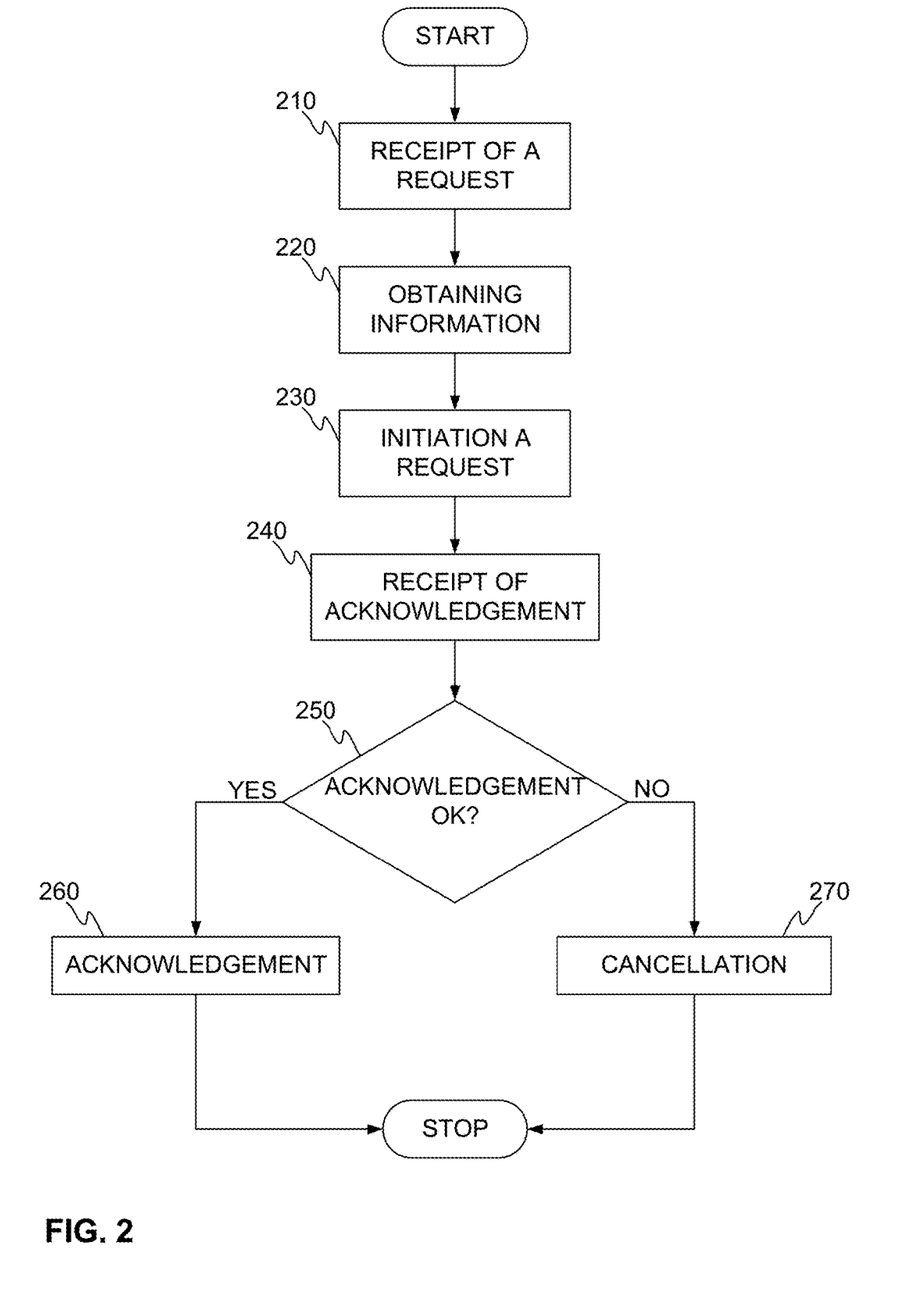
FIG. 2 schematically illustrates an example of a method according to the invention.

Next the method according to an example of the invention is described by referring to FIG. 2. The method according to the invention is initiated with an NFC interaction of a user terminal 110 equipped with a SIM card comprising a secure element and a NFC reader 120. At least one identifier is stored with the secure element of the SIM card, which identifier may be used in a transaction. More specifically, the identifier stored in the secure element of the SIM card is retrieved during the NCF interaction of the user terminal 110 and the NFC reader. The retrieval of the identifier may be arranged so that it is automatically transferred during the interaction by pushing it to the NFC reader by the user terminal 110 or the NFC reader 120 may be configured to deliver an identifier request message to the user terminal 110, which, in response to a receipt of the request, is configured to retrieve the requested identifier from the secure element of the SIM. In some implementation of the invention the user terminal may comprise a software application installed and executed by a processor of the user terminal. The application may be configured to monitor any information exchange during the NFC interaction and to control an access to the secure element of the SIM card. In some further implementation the application may be arranged to prompt an acceptance from the user if the secure element is to be accessed and in that manner some information, such as the identifier, is retrieved from the secure element of the SIM.

The NFC reader 120 is configured to deliver the retrieved identifier to the backbone system 125, which may, or may not, add transaction related information, such as an amount of the transaction i.e. the value, into a request message arranged to be delivered to the server 125. If the amount of the transaction is not added to the request message, it may be delivered as a separate message to the server 130.

The server 130 is configured, in response to a receipt of the request 210, to initiate a determination of a payment card number, which corresponds to the identifier received in the request. The information on the payment card is obtained 220 from a data storage maintaining and storing information on identifiers stored in secure elements of subscriber identity modules and payment card numbers defined to correspond to the identifiers. In other words, the telecom operator is storing information on an identifier and a corresponding payment card number, or any similar identifier. The arrangement is advantageous due to the fact that the telecom operator, or a respective party, providing the subscriber identity modules to the users may store any information in the secure element of the subscriber identity module, such as one or more identifiers to be used in an inventive manner as described herein. The input of payment card number may e.g. be arranged through a web access, which prompts user to input the payment card number and which input information is linked with the SIM provided to the same user, and thus with at least one identifier stored in the secure element of the SIM. The data storage in which the obtainable information is stored may be a memory arranged in the server 130 or an external memory to the server 130. The information may be stored as a database structure.

In response to obtaining information as described the server 130 is configured to initiate a transaction request 230 towards a transaction management system 140 managing transactions corresponding to the payment card in question. The destination address for the transaction request may be determined from the payment card number or the address for the transaction request may be stored in the data storage. For example, the server may initiate a query towards a central database storing information on destination addresses for payment card companies. Alternatively or in addition, the server may store information on destination addresses, and the correct destination address may be determined on the basis of payment card number received in the described manner. The transaction request may also comprise the amount of the transaction, or the information on the amount may be delivered in a separate message to the transaction management system 140.

The transaction management system 140 is configured to perform necessary operations in order to determine if the transaction is allowable or not. Such operation may comprise, but are not limited to, checking if the payment card comprises enough debit or credit for the transaction and/or if the user is entitled to perform the transaction, for example. The transaction management system 140 is configured to compose an acknowledgement message comprising information if the transaction is allowable or not and to deliver the information to the server 130. The server 130 is configured to determine i.e. evaluate 250 the content of the acknowledgement message and if the acknowledgment comprises an indication on a positive result of the transaction, the server 130 is configured to compose and to deliver a positive acknowledgement message 260 towards the backbone system 125 in order to provide indication to an operator, like to a salesperson, that the transaction is successful. On the contrary, if the server 130 determines 250 a negative indication from the acknowledgement message as a result of the transaction, the server 130 may be configured to initiate a cancellation 270 of the transaction. The cancellation 270 may be implemented by delivering cancellation message towards the backbone system 125 in order to provide an indication to an operator, like to a salesperson, that the transaction is unsuccessful.

According to an example of the invention the received identifier from the secure element through the interaction is encrypted. In such a case the server 130 is configured to conclude, e.g. on a basis of format of a request 210 or content of the request 210, that the request comprises an encrypted identifier for a transaction. In response to this the server 130 is configured to decrypt the identifier with a pre-agreed decryption method and thus, on the basis of decrypted identifier information, to retrieve the corresponding payment card number. The described example of the invention increases a security within the system as typically all transaction related information shall be maintained as secret as possible.

Figure 3:
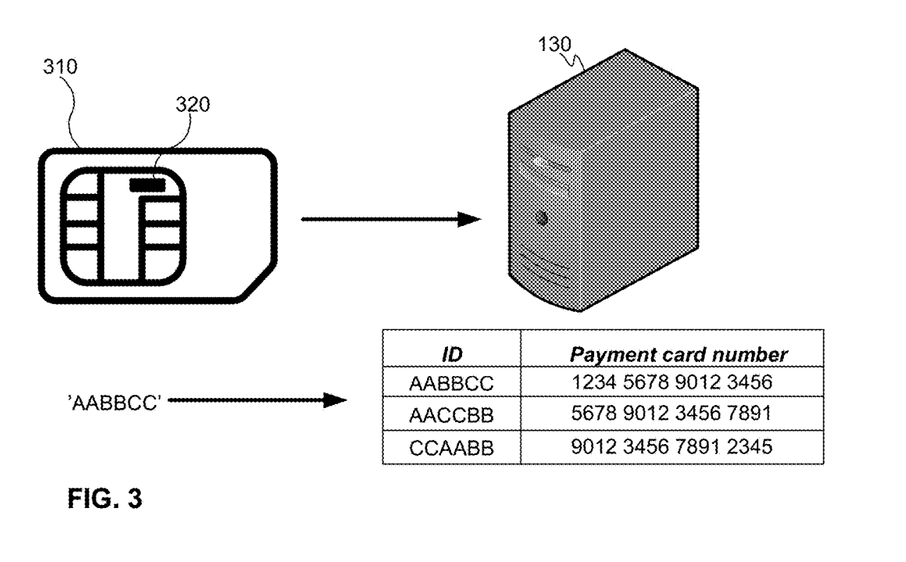
FIG. 3 schematically illustrates an example of exchange of information between network elements according to the invention.

According to a further example of the invention the security may be increased in such a manner that during the interaction of the user terminal 110 and NFC reader 120 also some SIM 310 related information is attached to the transferred information together with the identifier. For example, the information may be IMSI (International Mobile Subscriber Identity), which is used to identify the user of a cellular network. The IMSI is conveyed together with at least the identifier to the server 130. The server 130 is configured, in addition to any described operation regarding the identifier, to set up a query towards a register, such as HLR (Home Location Register), in a mobile communication network in order to check if the SIM card is valid or not. Alternatively or in addition, the query may return information on the owner of the SIM retrievable from the register, which owner information, such as name, may be compared in the server 130 to the information stored in the context of the identifier and payment card number. Naturally, this is possible if the server 130, or any other entity accessible by the server 130, is arranged to store information which may be compared to information retrievable from a register residing in a mobile communication network. If the pieces of information match, the server 130 may continue its operation as described. If the pieces of information do not match, the transaction is canceled. With this kind of arrangement it is possible to increase the security as information from multiple distinct sources may be compared.

According to still further example of the invention a timer may be set in the server 130. The timer may be set running when a transaction request 230 is initiated towards a transaction management system 140 managing transactions corresponding to the payment card in question. A maximum value is set for the timer, which determines the period of time during which the server 130 shall receive a response from the transaction management system 140. If this is not a case, the server 130 is configured to cancel the transaction in question. This kind of arrangement also increases the security since the server 130 comprises a mechanism to limit the response time. This is important especially in case if the request 230 has ended up to wrong, or even unauthorized party, which does not know the limitation for the response time. Also, if there is some malfunction within the transaction management system, it would be convenient for a user that the transaction is cancelled as soon as possible if it is not possible. This increases customer satisfaction for NFC payment.

FIG. 3 illustrates a subscriber identity module 310 according to an example of the present invention comprising a secure element 320, which is a memory space within the SIM managed by a party granting the SIM card. At least one identifier to be used in a transaction is configured to be stored in the secure element 320. In this example the identifier is AABBCC. In response to a NFC interaction the identifier is configured to be retrieved from the secure element and to be delivered to the server 130 through some intermediate devices and systems, as already described. The server 130 is arranged to store and to maintain information on identifiers (ID) and information on payment card numbers corresponding to each identifier established in the server. In response to the receipt of the identifier the server 130 is configured to determine a corresponding payment card number from a data structure accessible by the server 130. In this case the corresponding payment card number to the identifier AABBCC is 1234 5678 9012 3456.

Figure 4:
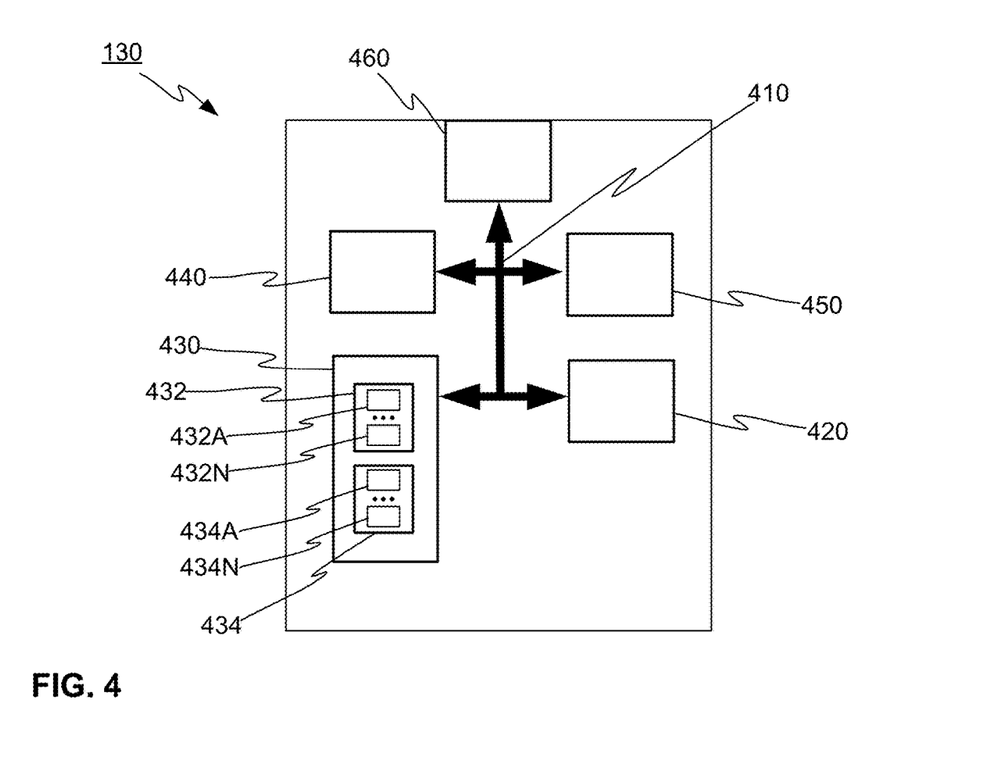
FIG. 4 schematically illustrates an example of a server according to the present invention.

FIG. 4 illustrates an example of a server, which is configured to implement the method as described above. The server 400 comprises, for example, a bus 410, a processor 420, a memory 430, input means 440, output means 450, and a communication interface 460. The bus 410 may include means or methods that enable communication among the elements of the server 400. The term 'server' shall be understood to cover any computing device comprising necessary hardware and computer program code stored in a memory, which may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the server 130, such as a keyboard, a mouse, a pen, a touch screen, voice recognition and/or biometric mechanisms, CD/DVD/Blue-ray drive etc. The output means 450 may comprise a conventional mechanism that outputs information, including a display, a printer, a speaker, etc. The input and output means are not necessarily implemented into the server 130, but may be coupled to the server 130 with some known interfaces either wirelessly or in a wired manner when needed. In some examples of the invention the server does not comprise any input means 440 or output means 450 as the server operates as a standalone entity, which is controlled externally through the communication interface 460.

The communication interface 460 may enable the server 130 to communicate with other elements and/or servers, but also with networks, as well as with client terminals either directly or indirectly.

The server 130 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the server 130 according to an example of the invention.

As said, FIG. 4 illustrates an example of the server 130 according to the invention. The elements as disclosed in FIG. 4 do not necessarily exist in all implementations of the server 130. For example, the server 130 may not comprise input means 440 and output means 450, but the server 130 may be accessed through the communication interface 460 with applicable devices and servers. As well, the number and type of memories may vary. Further, the amount of portions of computer program code may depend on the implementation.

Moreover, the present invention relates to a system implementing the method as described. More specifically, the system for performing at least partly a transaction wherein the transaction is initiated with near field communication, NFC, interaction comprises a NFC reader which is configured to interact with a secure element of a subscriber identity module residing in a user terminal in order to obtain an identifier stored in the secure element. Further, the system comprises a transaction management system for performing a confirmation operation for the transaction and a server communicatively coupled to the NFC reader and to the transaction management system. The server is configured to perform the method as described within the system by communication with the other entities belonging to the system.

In the description above only those elements are described and illustrated, which are relevant in describing the present inventive idea. The communication between different elements may be either direct or indirect. The direct communication may refer to a solution in which an element in question comprises a necessary communication interface implemented with applicable hardware and software in order to establish a communication channel directly with another element and implement some communication protocol in the communication. The indirect communication, in turn, may refer to a solution in which an element is coupled with another element through one or more elements, such as one or more devices and/or one or more systems. A communication channel is established between the mentioned elements through other elements or via the other elements.

The foregoing description gives a disclosure in such a level that the invention may be understood. In the description different network elements and entities coupled either directly or indirectly to the network and to each other are described to communicate with each other. The communication may utilize any known technology between the elements, such as TCP/IP protocol with necessary encryption and protection methods between the elements, wherein the mentioned pieces of information may be carried to.

In the description above it is discussed that the server determines the payment card number in response to receiving the identifier from the subscriber identity module. In some implementations the payment card number stored in data storage, or the information, may comprise loyalty card data. This enables addition of any bonus points to the loyalty program, when the transaction is performed in a manner as described.

Some advantageous embodiments according to the invention were described above. The invention is not limited to the embodiments described. The inventive idea can be applied in numerous ways within the scope defined by the claims attached hereto.

The invention claimed is:
1. A method for performing a transaction by way of a near field communication (NFC) interaction between an NFC reader (120) and a user terminal (110) that includes a subscriber identity module (310) residing therein, the method comprising:
   receiving, at a server in communication with the NFC reader (120), a request for the transaction (210), the request including an amount of the transaction and an identifier, the identifier obtained via the NFC interaction between the NFC reader (120) and the user terminal (110), whereby the identifier is retrieved from a secure data storage element (320) of the subscriber identity module (310) residing in the user terminal (110);
   obtaining, at the server, a payment card number corresponding to the identifier (220) included with the request by initiating a query to a data storage accessible to the server (130), the data storage storing information on at least one identifier and at least one payment card number corresponding to the identifier;
   initiating, at the server, a transaction request (230) towards a transaction management system (140) that manages transactions with the obtained payment card corresponding to the identifier retrieved from the subscriber identity module (310), where the transaction request comprises the amount of the transaction and the obtained payment card number; and
   determining, at the server, whether the transaction request toward the transaction management system (140) is successful, where in the event the server receives a successful acknowledgment from the transaction management system (140) to the transaction request, the server generates a positive acknowledgement message (260), and in the event the server receives an unsuccessful acknowledgement from the transaction management system to the transaction request, the server cancels the transaction (270).

2. The method according to claim 1, further comprising:
   decrypting, at the server, the identifier obtained from the secure element (320) of the subscriber identity module (310) residing in the user terminal (110) through the interaction between the NFC reader (120) and the user terminal (110) prior to obtaining the payment card number from the data storage.

3. The method according to claim 1, further comprising:
   receiving, at the server, a subscriber identity module (310) related information in the request together with the amount of the transaction and the identifier; and
   generating, at the server, a query towards a register residing in a mobile communication network by utilizing the subscriber identity module (310) related information in order to establish a second level security.

4. The method according to claim 1, further comprising:
   initiating, at the server, a timer in response to the transaction request towards the transaction management system (140);
   monitoring if the timer reaches a predetermined maximum value before receiving an acknowledgment from the transaction management system (140); and
   in the event the timer reaches the predetermined maximum value, canceling the transaction.

5. A server (130) for performing at least partly a transaction wherein the transaction is initiated with a near field communication (NFC) interaction between an NFC reader (120) and a user terminal (110) that includes a subscriber identity module (310) residing therein, the server (130) comprising:

a processing unit (420); and a memory unit (430) storing portions of computer program code, wherein the processing unit (420) upon execution of the computer program code, is caused to:

receive, at the server (130), a request for the transaction, the request including an amount of the transaction and an identifier, the identifier obtained via the NFC interaction between the NFC reader (120) and the user terminal (110), whereby the identifier is retrieved from a secure data storage element of the subscriber identity module residing in the user terminal,     obtain a payment card number corresponding to the identifier included with the request by initiating a query to a data storage accessible to the server, the data storage storing information on at least one identifier and at least one payment card number corresponding to the identifier,     initiate a transaction request towards a transaction management system that manages transactions with the obtained payment card corresponding to the identifier retrieved from the subscriber identity module (310), where the transaction request comprises the amount of the transaction and the obtained payment card number, and     determine whether the transaction request toward the transaction management system (140) is successful, where in the event a successful acknowledgment is received from the transaction management system to the transaction request, a positive acknowledgement message is generated, and in the event an unsuccessful acknowledgement is received from the transaction management system to the transaction request, the transaction is canceled.

6. The server (130) according to claim 5, wherein the software further causes the processing unit (420) to decrypt the identifier obtained from the secure element of the subscriber identity module residing in the user terminal through the interaction between the NFC reader and the user terminal prior to obtaining the payment card number from the data storage.

7. The server (130) according to claim 5, wherein the software further causes the processing unit (420) to     receive subscriber identity module related information in the request together with the amount of the transaction and the identifier, and     generate a query towards a register residing in a mobile communication network by utilizing the subscriber identity module related information in order to establish a second level security.

8. The server (130) according to claim 5, wherein the software further causes the processing unit (420) to     initiate a timer in response to the transaction request towards the transaction management system,     monitor if the timer reaches a predetermined maximum value before receiving an acknowledgment from the transaction management system, and     in the event the timer reaches the predetermined maximum value, canceling the transaction.

9. A system for performing at least partly a transaction initiated with near field communication (NFC), the system comprising:

a NFC reader (120), configured to interact with a secure element (320) of a subscriber identity module (310) of a user terminal (110) in order to retrieve an identifier stored in the secure element;

a transaction management system (140) for confirming the transaction; and     a server (130) communicatively coupled to the NFC reader and to the transaction management system, the server configured to         receive a request for the transaction from the NFC reader, the request including an amount of the transaction and the identifier, the identifier obtained via an NFC interaction between the user terminal (110) and the NFC reader (120) whereby the identifier is retrieved from the secure element of the subscriber identity module of the user terminal,         obtain a payment card number corresponding to the identifier included with the request by initiating a query to a data storage accessible to the server, the data storage storing information on at least one identifier and at least one payment card number corresponding to the identifier,         initiate a transaction request towards a transaction management system that manages transactions with the obtained payment card corresponding to the identifier retrieved from the subscriber identity module (310), where the transaction request comprises the amount of the transaction and the obtained payment card number, and         determine whether the transaction request toward the transaction management system (140) is successful, where in the event a successful acknowledgment is received from the transaction management system to the transaction request, a positive acknowledgement message is generated, and in the event an unsuccessful acknowledgement is received from the transaction management system to the transaction request, the transaction is canceled.

10. The method according to claim 2, further comprising:

receiving, at the server, a subscriber identity module (310) related information in the request together with the amount of the transaction and the identifier; and generating, at the server, a query towards a register residing in a mobile communication network by utilizing the subscriber identity module (310) related information in order to establish a second level security.

11. The method according to claim 2, further comprising:

initiating, at the server, a timer in response to the transaction request towards the transaction management system (140);

monitoring if the timer reaches a predetermined maximum value before receiving an acknowledgment from the transaction management system (140); and in the event the timer reaches the predetermined maximum value, canceling the transaction.

12. The method according to claim 3, further comprising:

initiating, at the server, a timer in response to the transaction request towards the transaction management system (140);

monitoring if the timer reaches a predetermined maximum value before receiving an acknowledgment from the transaction management system (140); and in the event the timer reaches the predetermined maximum value, canceling the transaction.

13. The server (130) according to claim 6, wherein the software further causes the processing unit (420) to     receive subscriber identity module related information in the request together with the amount of the transaction and the identifier, and     generate a query towards a register residing in a mobile communication network by utilizing the subscriber identity module related information in order to establish a second level security.

14. The server (130) according to claim 6, wherein the software further causes the processing unit (420) to initiate a timer in response to the transaction request towards the transaction management system, monitor if the timer reaches a predetermined maximum value before receiving an acknowledgment from the transaction management system, and in the event the timer reaches the predetermined maximum value, the transaction is canceled.

15. The server (130) according to claim 7, wherein the software further causes the processing unit (420) to initiate a timer in response to the transaction request towards the transaction management system, monitor if the timer reaches a predetermined maximum value before receiving an acknowledgment from the transaction management system, and in the event the timer reaches the predetermined maximum value, the transaction is canceled.

* * * * *